US007814188B2

(12) United States Patent
Tice et al.

(10) Patent No.: US 7,814,188 B2
(45) Date of Patent: Oct. 12, 2010

(54) SYNCHRONIZED WIRELESS COMMUNICATIONS SYSTEM

(75) Inventors: Lee Tice, Bartlett, IL (US); Mark C. Bohanon, Aurora, IL (US)

(73) Assignee: Honeywell International Inc., Morristown, NJ (US)

(*) Notice: Subject to any disclaimer, the term of this patent is extended or adjusted under 35 U.S.C. 154(b) by 1055 days.

(21) Appl. No.: 10/737,266

(22) Filed: Dec. 16, 2003

(65) Prior Publication Data
US 2005/0159152 A1 Jul. 21, 2005

(51) Int. Cl.
*G06F 15/16* (2006.01)
(52) U.S. Cl. ............... 709/223; 709/225; 709/226; 709/227; 709/228; 709/229; 370/324; 370/338; 370/350; 370/503; 370/516
(58) Field of Classification Search ............ 370/503, 370/514–516, 324, 338, 350; 709/223, 225, 709/226, 227, 228, 229
See application file for complete search history.

(56) References Cited

U.S. PATENT DOCUMENTS

| | | | |
|---|---|---|---|
| 4,194,153 A | 3/1980 | Masaki et al. ............ 455/31 |
| 4,398,192 A | 8/1983 | Moore et al. ............ 340/825.44 |
| 4,449,248 A | 5/1984 | Leslie et al. ............ 455/38 |
| 4,745,408 A | 5/1988 | Nagata et al. ............ 340/825.44 |
| 4,916,432 A | 4/1990 | Tice et al. | |
| 4,964,121 A | 10/1990 | Moore ............ 370/100.1 |
| 4,995,099 A | 2/1991 | Davis ............ 455/343 |
| 4,996,526 A | 2/1991 | DeLuca ............ 340/825.44 |
| 5,027,428 A | 6/1991 | Ishiguro et al. ............ 455/67 |
| 5,117,219 A | 5/1992 | Tice et al. | |
| 5,121,407 A | 6/1992 | Partyka et al. | |
| 5,140,698 A | 8/1992 | Toko ............ 455/76 |
| 5,150,361 A | 9/1992 | Wieczorek et al. ............ 370/95.1 |
| 5,151,693 A * | 9/1992 | Onoe et al. ............ 340/5.28 |
| 5,241,562 A | 8/1993 | Partyka et al. | |
| 5,251,325 A | 10/1993 | Davis et al. ............ 455/38.3 |
| 5,334,319 A | 8/1994 | Tomizawa et al. ............ 252/46.006 |
| 5,347,515 A | 9/1994 | Marino | |
| 5,386,515 A | 1/1995 | Martin et al. ............ 395/275 |
| 5,392,457 A | 2/1995 | Davis et al. ............ 455/38.3 |
| 5,463,763 A | 10/1995 | Kubo ............ 714/4 |
| 5,509,136 A | 4/1996 | Korekata et al. ............ 395/478 |

(Continued)

FOREIGN PATENT DOCUMENTS

WO   99/50848   7/1999

OTHER PUBLICATIONS

"Duplicate Internet Protocol Address Detection Based on Gratuitous Address Resolution Protocol", IBM Technical Disclosure Bulletin, vol. 41, No. 01, Jan. 1998, pp. 703-705.

(Continued)

*Primary Examiner*—Rupal D Dharia
*Assistant Examiner*—Van Kim T Nguyen
(74) *Attorney, Agent, or Firm*—Husch Blackwell Sanders Welsh & Katz

(57) ABSTRACT

A wireless communications system incorporates a plurality of synchronized wireless units. Each unit minimizes energy requirements by entering a low current, inactive, state between synchronizing signals. The unit automatically enters an active state prior to receipt of the next synchronizing signal.

16 Claims, 4 Drawing Sheets

U.S. PATENT DOCUMENTS

| | | | |
|---|---|---|---|
| 5,539,725 A | 7/1996 | Trubey et al. ............... 370/13 |
| 5,675,736 A | 10/1997 | Brady et al. ............... 709/239 |
| 5,812,767 A | 9/1998 | Desai et al. ............. 395/200.8 |
| 5,832,304 A | 11/1998 | Bauman et al. ............. 395/860 |
| 5,931,916 A | 8/1999 | Barker et al. ............... 709/239 |
| 5,987,506 A | 11/1999 | Carter et al. ............... 709/213 |
| 6,002,669 A * | 12/1999 | White ....................... 370/235 |
| 6,032,213 A | 2/2000 | Gulick ...................... 710/312 |
| 6,038,639 A | 3/2000 | O'Brien et al. ............. 711/114 |
| 6,101,499 A | 8/2000 | Ford et al. ................... 707/10 |
| 6,185,638 B1 | 2/2001 | Beardsley et al. ............ 710/36 |
| 6,192,230 B1 * | 2/2001 | van Bokhorst et al. ... 455/343.3 |
| 6,243,372 B1 | 6/2001 | Petch et al. ................ 370/350 |
| 6,350,803 B1 | 2/2002 | Huang et al. ................ 524/440 |
| 6,498,563 B1 | 12/2002 | Tice et al. |
| 6,513,094 B1 | 1/2003 | Magro ....................... 711/103 |
| 6,519,678 B1 | 2/2003 | Basham et al. ............. 711/112 |
| 6,542,962 B2 | 4/2003 | Kodama et al. ............. 711/114 |
| 6,553,002 B1 | 4/2003 | Bremer et al. ............. 370/254 |
| 6,577,232 B1 | 6/2003 | Hawkinson et al. |
| 6,665,520 B2 * | 12/2003 | Romans ..................... 455/13.4 |
| 6,694,149 B1 * | 2/2004 | Ady et al. ................... 455/522 |
| 6,707,867 B2 * | 3/2004 | Diepstraten et al. ......... 375/354 |
| 6,718,228 B2 | 4/2004 | Campbell et al. ........... 700/214 |
| 6,724,834 B2 * | 4/2004 | Garrett et al. ............... 375/317 |
| 6,779,077 B1 | 8/2004 | Bakke et al. ................ 711/111 |
| 6,782,448 B2 | 8/2004 | Goodman et al. ........... 711/112 |
| 6,816,510 B1 * | 11/2004 | Banerjee ..................... 370/503 |
| 6,879,567 B2 * | 4/2005 | Callaway et al. ............ 370/311 |
| 6,920,485 B2 | 7/2005 | Russell ....................... 709/214 |
| 6,944,188 B2 * | 9/2005 | Sinha et al. ................. 370/503 |
| 7,050,409 B1 * | 5/2006 | O'Scolai et al. ............. 370/329 |
| 7,072,432 B2 * | 7/2006 | Belcea ........................ 375/356 |
| 7,103,344 B2 * | 9/2006 | Menard ................... 455/343.2 |
| 7,155,162 B2 * | 12/2006 | Doi et al. ...................... 455/39 |
| 7,197,304 B2 * | 3/2007 | Chung et al. ................ 455/424 |
| 7,212,512 B2 * | 5/2007 | Lucas et al. ................. 370/338 |
| 7,366,532 B2 * | 4/2008 | Khawand et al. ............ 455/502 |
| 7,539,520 B2 * | 5/2009 | Twitchell, Jr. ............... 455/574 |
| 2003/0185158 A1 * | 10/2003 | Lucas et al. ................. 370/252 |

OTHER PUBLICATIONS

Supplementary European Search Report corresponds to European Application No. EP 04 79 6156, Oct. 15, 2007.

Schurgers, C. et al.; "Topology Management for Sensor Networks: Exploiting Latency and Density" Mobihoc 2002. Proceedings of the 3rd. ACM International Symposium on Mobile, Jun. 9, 2002.

Ad Hoc Networking and Computing. Lausanne, Switzerland, Jun. 9, 2002, pp. 135-145, XP001171557; ISBN: 1-58113-501-7.

* cited by examiner

DEVICES GENERATE DATA BITS THAT HAVE DIFFERENT PULSE POSITION DEPENDING ON EITHER A RANDOM NUMBER OR THE DEVICES UNIQUE ID

DEVICES GENERATE DATA BITS THAT HAVE DIFFERENT PULSE WIDTH DEPENDING ON EITHER A RANDOM NUMBER OR THE DEVICES UNIQUE ID.

FIG. 4

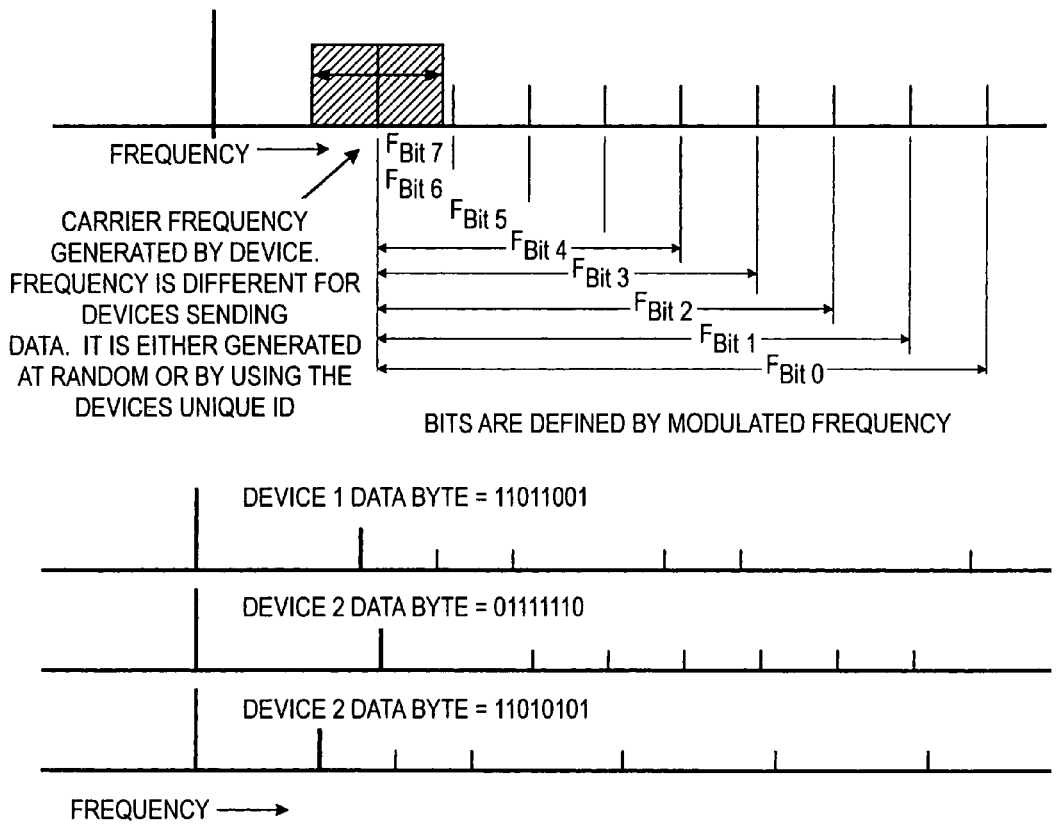

FREQUENCY →

CARRIER FREQUENCY GENERATED BY DEVICE. FREQUENCY IS DIFFERENT FOR DEVICES SENDING DATA. IT IS EITHER GENERATED AT RANDOM OR BY USING THE DEVICES UNIQUE ID

BITS ARE DEFINED BY MODULATED FREQUENCY

DEVICE 1 DATA BYTE = 11011001

DEVICE 2 DATA BYTE = 01111110

DEVICE 2 DATA BYTE = 11010101

FREQUENCY →

DEVICES SEND A WHOLE BYTE AT A TIME. AT SOME TIME AFTER STARTING THE TRANSMIT, THEY MONITOR THEIR RECEIVED BYTES AND PERFORM BIT ARBITRATION. IF A HIGHER VALUE IS DETECTED, THEY TURN OFF THEIR TRANSMITTER. AT THE END OF THE BYTE TIME, ONLY ONE DEVICE WILL BE COMMUNICATING.

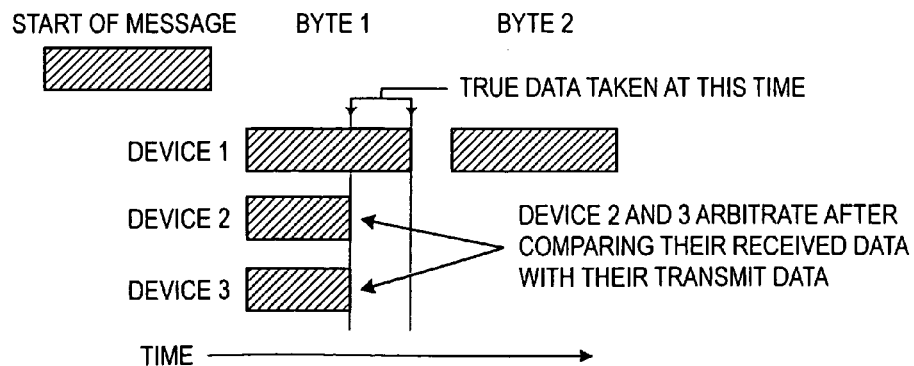

SYNCHRONIZED WIRELESS COMMUNICATIONS SYSTEM

FIELD OF THE INVENTION

The invention pertains to wireless communications systems. More particularly, the invention pertains to such systems which also minimize energy requirements between synchronization signals.

BACKGROUND

Electrical units which can communicate wirelessly can often be readily installed in circumstances where it is either inconvenient or undesirable to install a wired network. In other circumstances, it is useful and convenient to use both wired and wireless devices in the same system, depending on specific needs.

Wireless devices are found, for example, in the form of wireless hazardous condition detectors such as smoke detectors, fire detectors, flame detectors, thermal detectors, or gas detectors. Still other wireless units have been implemented in the form of condition detectors, such as position detectors, motion detectors, passive infrared detectors and the like. Other types of wireless electrical units implement a desired function, such as opening or closing doors, locking or unlocking doors, controlling motors, controlling relays, solenoids or the like, all without limitation.

One of the known problems associated with using wireless electrical units has been the power consumed during normal operation of the device. Where the wireless unit can be coupled to an exterior source of energy, such as utility supplied power, electrical energy requirements to operate the respective unit or units can be readily met. In other types of installations where the units must be battery powered, energy consumption can become a serious limitation.

One of the reasons that energy consumption in known units is problematic is that the wireless receiver in the respective device must be continuously "on", and drawing electrical power so that incoming signals can be received and sensed at the unit.

Fire detectors that use RF communication methods have typically incorporated transmitters only due to the reduction of battery life that results when receivers are implemented in the detectors. The receivers are generally ON all the time because they are asynchronous to the other devices in the system.

There is a continuing, on-going need for wireless electrical units with reduced or minimal current requirements. Preferably, such units could be implemented to carry out the known types of functions associated with such units while at the same time, reducing unit energy requirements. Preferably, such units would be installable in both new and existing systems.

BRIEF DESCRIPTION OF THE DRAWINGS

FIG. 4 illustrates a method of device discrimination.

DESCRIPTION OF THE PREFERRED EMBODIMENTS

Figure 1:
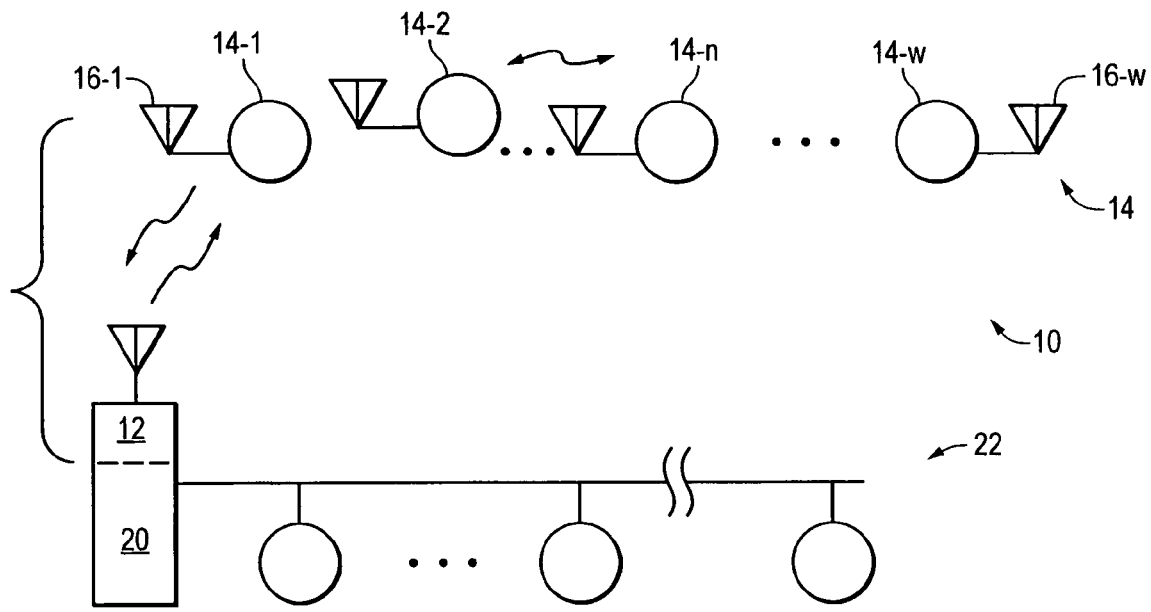
FIG. 1 is a block diagram of a system in accordance with the invention.

While this invention is susceptible of an embodiment in many different forms, there are shown in the drawing and will be described herein in detail specific embodiments thereof with the understanding that the present disclosure is to be considered as an exemplification of the principals of the invention. It is not intended to limit the invention to the specific illustrated embodiments.

A method that embodies the invention uses both transmitters and receivers in detectors and still maintains a long battery life by synchronizing the detector as described below.

In one embodiment of this invention, a master device provides synchronization signals for other devices in the wireless system. This master device may be linked to other, wired parts of the system or to other timers for the purpose of establishing the synchronization signals.

The master device transmits a periodic synchronization signal. The other devices will adjust their individual ON/OFF, active/inactive, times to match the expected synchronizing signal.

In a system in accordance with the invention, the devices learn the timing of a periodic synchronization signal and then go to a "sleep or OFF" state between synchronizing signals. For example, a synchronization signal could have a period of 10 seconds. All devices that have learned the 10 second period, go to a "wake or ON" state just prior to the expected arrival of the next synchronization signal.

In an exemplary embodiment, all devices have their receivers turned ON and receive incoming signals evaluating the content of information in the signal and responding appropriately. If the signal is requesting information (alarm, trouble, output state, etc.) to be transmitted by some or all of the devices, then the appropriate devices will respond as programmed to activate their transmitters and transmit such information which is then received by some or all devices in the system.

The advantages of such synchronization include 1) the devices can operate both transmitters and receivers while maintaining a long battery life, 2) the devices can parallel process information regarding system conditions (alarms, troubles, output states, input states, etc.) from other devices, 3) there are no communication collisions that corrupt data or interfere with communication, and 4) the devices can be programmed or have their programs changed through a wireless link.

The devices can include smoke, gas, temperature, light, beam, etc. types of detectors. Other devices could include control units of various types such as horns sounders, alarm indicating lights, motion controls, relay or solenoid control units and the like without limitation.

Wireless transmission can be effected using RF frequencies, sonic, ultrasonic, optical frequencies such as infrared or higher frequencies all without limitation. Modulation type is not a limitation of the invention, nor are the nature and character of the synchronization signals. Exemplary types of modulation include spread spectrum, multiple frequencies, FM modulation, AM modulation, or ON/OFF keying.

Different communication configurations of a system can be used without limitation. In a preferred system, the devices have their receiver and transmitters tuned to the same frequencies (can be spread spectrum). This means that the devices will receive any signals that are transmitted on that frequency including their own transmissions. Alternately reception and transmission can be at different frequencies.

The devices are programmed to become active just before the expected time of arrival of the synchronization signal and to stay active until it is received. The respective device(s) will then prepare to transmit their information to transmit based upon the information in the synchronization signal and/or their states or conditions. All devices incorporate a high accuracy internal clock and have a synchronized internal time base. At a specific preset time, they will begin their transmissions.

For a new device that is installed in the respective system or if a device does not properly establish the timing for the synchronization signal, the respective device will continually maintain its receiver ON until it receives the expected synchronization signal. Then it will establish the timing to go into an active/inactive cycle that matches the synchronization timing. If it later awakens, becomes active and finds no synchronization signal, it will stay ON and wait for a synchronization signal so as to readjust its timing for the active/inactive cycle.

If the controller/sender of the synchronization signal has failed, then another device can take over that role and become the sender of synchronization signals for the system. The selection of the sender can be by preprogramming or by any other method.

In the preprogrammed method, the absence of the synchronization signal for a predetermined period of time will activate the next-in-line controller. In one of many other methods, each device selects a random priority message. All devices in the system arbitrate the priority of this message and select a new device, which becomes the controller/sender of the synchronization signals.

A signal or bit arbitration method can be incorporated to prevent devices from transmitting conflicting digital information. For example, a device uses ON/OFF keying wherein ON is represented by transmitting the frequency and OFF is not transmitting the frequency. The devices all start their messages at the same time and continually monitor their receivers to check that the received signal is the same as their transmitted signal (receiving a 0 bit when transmitting a 0 bit, receiving a 1 bit when transmitting a 1 bit).

Because transmitting a frequency has priority over not transmitting a frequency, the devices monitor their own transmissions as well as the transmissions of the other devices. If they receive a 1 bit when they are trying to send a 0 bit, then they know that another device has a higher priority message than their own message and they stop transmitting until the other message is completed. After the other message is completed, they again try to send their own message that continues to be bit arbitrated with all other messages. Eventually, the message of each device will be completed in order of the priority of the messages in the RF system.

Another method of signal arbitration is to have each device start its respective message with a time duration priority signal that is compared by that device with all other devices in the system. The longer the time duration, of the priority signal, the higher the priority of the message. When it is time for the devices to transmit information, each transmits a continuous signal with a time length preprogrammed according to the priority.

Each device is monitoring its own receiver which receives both its own transmissions and the transmissions of all other devices. A device stops sending its priority signal and the receiver is still receiving a priority signal from another device, then that device knows that another device has a higher priority and will wait until the other device completes its message before retrying to send its own message.

The restart of the next message time is referenced to the end of the previous message so all remaining devices that need to transmit information remain coordinated and synchronized. This arbitration can use a single signal or a series of signals to establish this priority without departing from the spirit and scope of this arbitration method. Other arbitration methods, without limitation, can be used with the devices to prevent the collision of messages within this synchronized system.

FIG. 1 illustrates an exemplary system 10 with a controller/sender of synchronization signals 12 and a plurality 14 of w wireless devices 14-1 . . . . 14-w that can receive and transmit signals between all devices as well as the controller 12. It will be understood that neither the device type nor the number of devices is a limitation of the invention.

The members of the plurality 14 are in wireless communication with one another as described in more detail subsequently. Each of the members of the plurality 14 incorporates, for example, and RF antenna 16-1 . . . 16-w which is coupled to a transceiver in the respective unit, best seen in FIG. 1A, to provide bi-directional communication between the members of the plurality 14 as well as the synchronizing control unit 12. It will be understood that the details of such communications are not limitation of the present invention. Additionally, whether or not the members 14 are in uni-directional communication with the synchronizing circuitry 12 or bi-directional communication is not a limitation of the present invention.

Unit 12 can be a stand alone unit or, can be incorporated into and part of more extensive alarm control circuitry 20. Circuitry 20 can be in communication with a plurality of ambient condition detectors/control units 22, all without limitation. Neither the details nor the number of the detectors/control units 22 are limitations of the present invention.

Relative to synchronizing/control circuit 12, it will be understood that synchronizing transmissions therefrom can be on the same or a different frequency or frequency band than the devices 14 receive and transmit on.

Figure 1A:
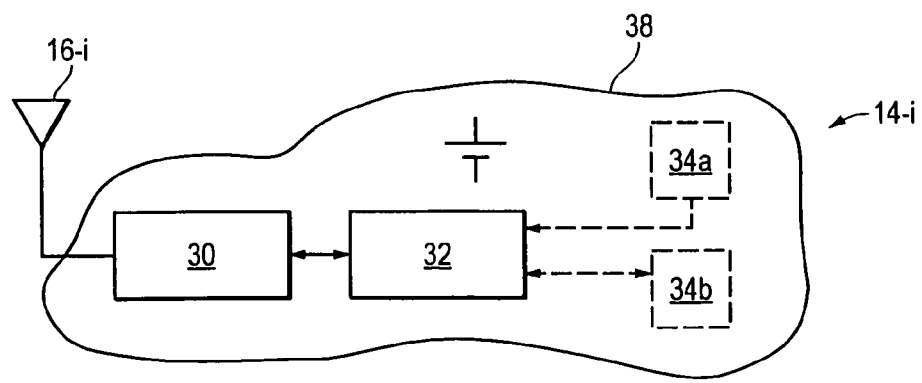
FIG. 1A is a block diagram of an electrical unit module in the system of FIG. 1.

FIG. 1A is a block diagram illustrating exemplary details of a representative member 14-i of the plurality 14. The member 14-i can incorporate a transceiver 30 which is coupled to an RF antenna 16-i, as well as control circuitry 32.

The control circuitry 32 can in turn receive signals from an optional ambient condition sensor or sensors 34a or other input devices. Alternately or in addition thereto, control circuitry 34 can communicate with optional output circuitry 34b which could include relays, solenoids, sounders, lights, enunciators, strobes or the like, all without limitation.

The unit 14-i receives electrical energy from an internal source 36. Source 36 can be implemented as a self-contained battery where the unit 14-i is carried within housing 38 and is mountable to a selected surface as appropriate for its function or functions as would be understood by those of skill in the art. Alternately, energy source 36 can be coupled to an exterior source of energy, such as utility supplied power if desired.

As described above, and relative to FIG. 2 subsequently, control circuitry 32 appropriately couples energy to transceiver 30 in anticipation of receiving synchronization signals from unit 12. It will be understood that if desired, only the receiver portion of transceiver 30 need be energized in anticipation of receipt of the synchronization signals.

Figure 2:
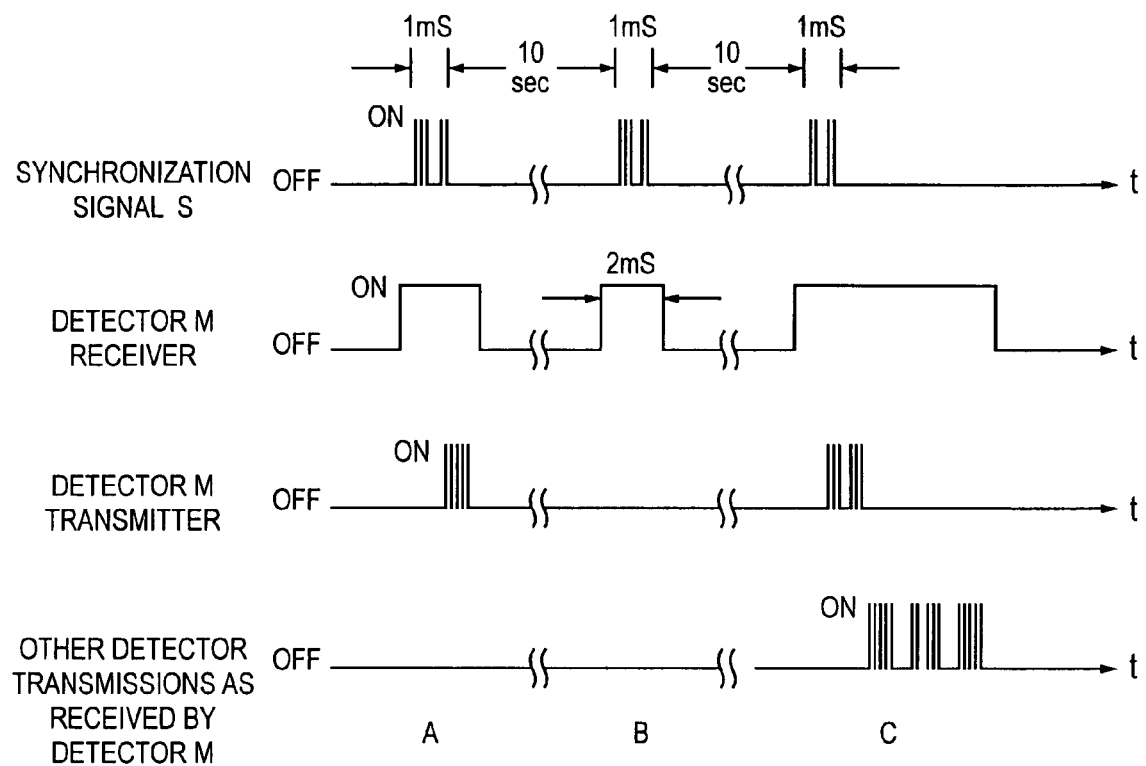
FIG. 2 is a timing diagram indicative of operation of the system of FIG. 1.

FIG. 2 illustrates activation of the devices 14 relative to the synchronization signals and transmissions which in this example are simply ON or OFF. In time period A, the device 14-n wakes up or becomes active just prior to the synchronization signal being sent. It receives the synchronization signals and determines that it is to respond with a device 14-n transmission based upon its internal state condition. Other devices were not to respond based upon their internal state conditions.

In time period B, the device 14-*n* wakes up just prior to the synchronization signal and determines that neither it nor any other detector have state conditions for it to respond. Time period B will be representative of the vast majority of times since state conditions in the devices change very infrequently.

During time period B, the receiver of each device is ON for only a little longer than 2 milliseconds every 10 seconds, yielding an average power consumption RECEIVER-ON/5,000. If the RECEIVER-ON current draw is 5 mA, then the average current draw related to the receiver would be 1 microamp.

In time period C, the devices 14 become active just prior to the expected arrival of the synchronization signals and various detectors determine that they have state conditions for multiple device responses. In this case, device 14-*n* has the highest priority and transmits first, followed by the other devices arbitrating to their transmission times.

While any device is transmitting, all the devices keep their receivers ON to receive any and all messages. This enables all devices to integrate the state conditions of other detectors with their own state to determine the response of the device (sound horn, turn on relay, etc.). For example, if the devices turn on a relay to activate a sprinkler system, they could require that other grouped devices or detectors also have a state condition that matches their own state condition.

Figure 3:
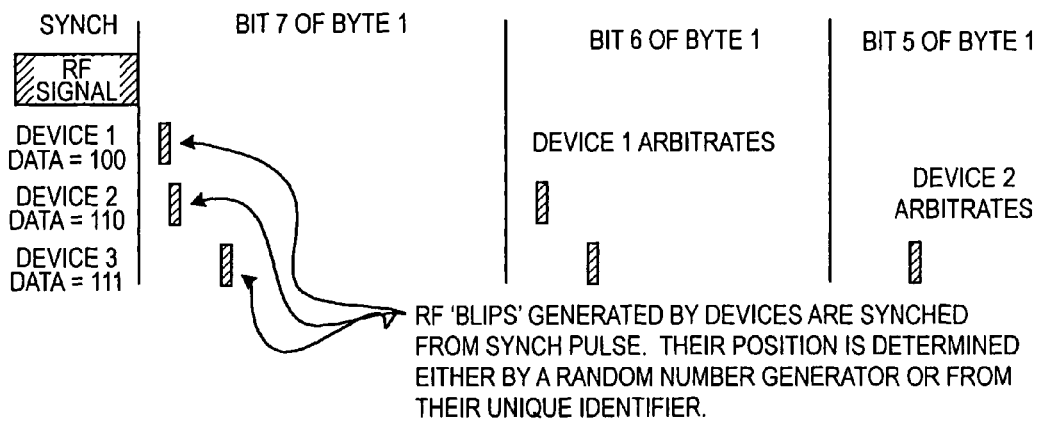
FIG. 3 illustrates another method of device arbitration.
Figure 3:
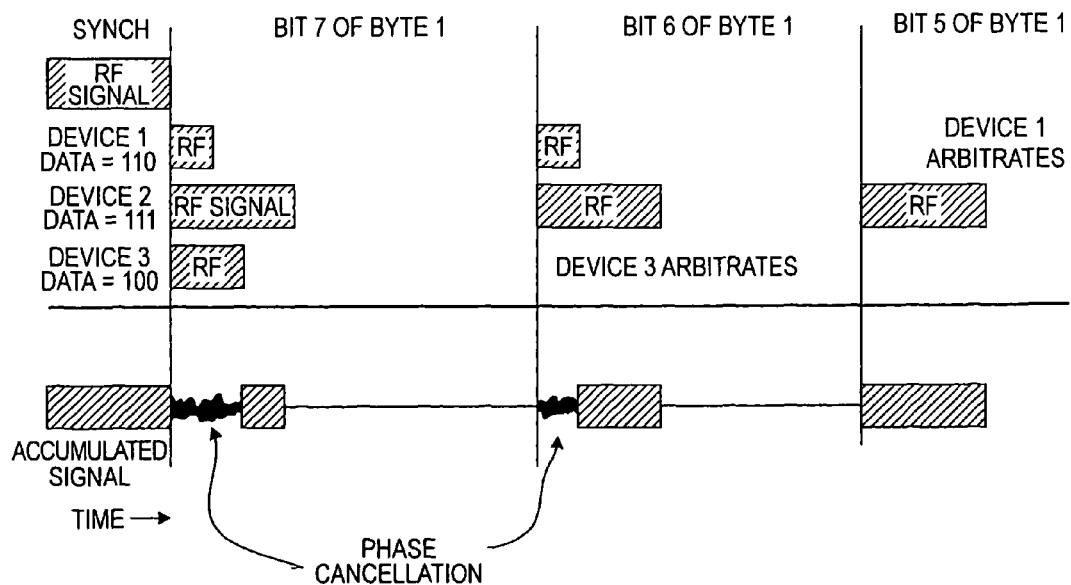

FIG. 3 illustrates another method of arbitration of the devices. Each transmits at a predetermined time after the RF synchronization signal is received. The devices can select the predetermined time based upon the information that they are going to transmit in combination with a random number selection or their unique address ID.

For example, in Bit 7 of Byte 1 time slot, devices 1, 2, and 3 are all going to transmit a data=1 bit. Each therefore will make a transmission during the time slot for Bit 7 of Byte 1 but at different random times or different address IDs so they do not overlap in time. In Bit 6 of Byte 1, device 1 is sending data=0 (no transmission) and devices 2 and 3 are transmitting data=1. Device 1 notes that another device transmitted a data=1 that has a higher priority during Bit 6 of Byte 1 time and thus arbitrates itself off the communication until the message by other devices is completed.

The above process continues until only one device is remaining and then that remaining device transmits its message without interference from other devices. Finally, the other devices transmit their message in order with their learned priorities from the arbitration process. Alternately the above process could be carried out without the devices learning their order from the prior message transmitting process.

FIG. 4 illustrates a method using different frequency modulations to discriminate the different devices. Each device is capable of receiving and decoding the frequency modulations to identify other devices simultaneously. The devices will arbitrate themselves according to the priority of the information being transmitted.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. An electrical unit having:
    a wireless communications port;
    a transceiver coupled to the port; and
    control circuitry coupled to the transceiver, the control circuitry and transceiver have, at least, an inactive mode interrupted by an intermittent, limited duration higher power active mode, the control circuitry including circuitry to monitor the port for receipt of a wireless synchronization signal, and responsive thereto to establish a predetermined time offset from the wireless synchronizing signal and only a receiver portion of the transceiver to enter the active mode at a time interval, corresponding to the offset, prior to receipt of subsequent wireless synchronizing signals and to receive other incoming signals with the control circuitry responding to an incoming signal requesting information by causing a transmitter portion of the transceiver to enter the active mode and transmitting requested information using at least one byte of information having a plurality of bits via the transceiver and where the control circuitry simultaneously monitors wireless signals received from the transceiver and upon detecting a received wireless signal in the absence of a transmitted wireless signal determines that a higher priority message is being received and responsive to that determination terminates the transmission before completion of the byte, said control circuitry including executable instructions for at least receiving data using a different protocol than a protocol exhibited by the synchronizing signal and executable instructions that sense and decode multiple data signals received from multiple sources substantially simultaneously and where the sense and decode process comprises bit arbitration.

2. A unit as in claim 1 which includes additional circuits to evaluate the received synchronizing signal and, responsive thereto, to determine if an additional message is expected.

3. A unit as in claim 2 which includes further circuitry to extend the active mode and to acquire and respond to any expected additional message.

4. A unit as in claim 2 where the control circuitry comprises, at least in part, a processor and executable instructions.

5. A unit as in claim 4 which includes timer circuitry, coupled to the processor, for initiating the periodic, limited duration active mode.

6. A unit as in claim 4 which includes executable instructions for transmitting data with a different protocol than a protocol of the received synchronizing signal.

7. A unit as in claim 1 where the control circuitry subsequent to terminating the transmission, restarts transmitting the requested information via the transceiver and where the control circuitry again simultaneously monitors signals received from the transceiver to determine if a higher priority message is being received.

8. A communication system having at least three devices that can wirelessly transmit and receive signals comprising:
    a first device that transmits a sequence of wireless, common, synchronization signals;
    a plurality of devices that receive the wireless synchronization signals where members of the plurality each include circuitry to transmit data signals at different offsets from the synchronizing signals in response to at least one of, a substantially random number, or, a unique device identifier;
    at least a second device of the plurality of devices receiving the wireless synchronization signals, the second device synchronizes functions to the synchronization signals under control of an internal clock such that energy consumption of a receiver of the second device is increased for a period of time before, during and immediately after each synchronization signal;
    at least a third device of the plurality of devices receiving the wireless synchronization signals, the third device synchronizes functions to the synchronization signals under control of an internal clock such that the energy consumption of a receiver of the third device is increased for a period of time before, during and immediately after each synchronization signal, where the second device receives a wireless signal including an information request and transmits a response to the information request based upon its internal state condition, said response having at least one byte of information with a plurality of bits with said transmitted response of the second device received by the third device and the third device receives a wireless signal including an information request and transmits a response to the information request based upon its internal state condition, said response having at least one byte of information with a plurality of bits, where energy consumption of transmitters of each of the second and third devices is increased and each of the second and third devices carries out a bit arbitration process while wirelessly transmitting signals at the same time, said bit arbitration including comparing a transmitted wireless signal of the transmitted responses with a received wireless signal; and the second or third device terminating transmission before completion of the byte upon detecting a received wireless signal in the absence of a transmitted wireless signal.

9. A system as in claim 8 where at least one of the second device or the third device includes a battery.

10. A system as in claim 8 where the synchronization signal is transmitted periodically with a predetermined timing.

11. A system as in claim 8 where the synchronization signal includes at least one of RF frequencies, optical frequencies or sonic frequencies.

12. A system as in claim 11 where a detector state comprises at least one of an alarm, trouble, voltage, input, or sensor condition.

13. A system as in claim 11 where the first device receives the transmitted signal.

14. A system as in claim 11 wherein the said transmitting of a signal includes at least in part a frequency that is the same as the synchronization signal frequency.

15. A system as in claim 8 where the synchronizing function includes transmitting a signal representative of a detector state.

16. A system as in claim 8 where the synchronization signal includes variable frequencies.

* * * * *